United States Patent [19]

Horst et al.

[11] Patent Number: 4,800,486
[45] Date of Patent: Jan. 24, 1989

[54] MULTIPLE DATA PATCH CPU ARCHITECTURE

[75] Inventors: Robert W. Horst, Cupertino; Shannon J. Lynch, Los Gatos; Cirillo L. Costantino, Castro Valley; John M. Beirne, Los Gatos, all of Calif.

[73] Assignee: Tandem Computers Incorporated, Cupertino, Calif.

[21] Appl. No.: 537,877

[22] Filed: Sep. 29, 1983

[51] Int. Cl.⁴ ............................................. G06F 9/28
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,886,523 | 5/1975 | Fergusen et al. | 364/200 |
| 3,900,723 | 8/1975 | Bethany et al. | 235/156 |
| 4,041,461 | 8/1977 | Kratz et al. | 364/200 |
| 4,101,960 | 7/1978 | Stoves et al. | 364/200 |
| 4,112,489 | 9/1978 | Wood | 364/200 |
| 4,128,880 | 12/1978 | Cray, Jr. | 364/200 |
| 4,179,734 | 12/1979 | O'Leary | 364/200 |
| 4,179,735 | 12/1979 | Lodi | 364/200 |
| 4,187,539 | 2/1980 | Eaton | 364/200 |
| 4,202,039 | 5/1980 | Epenay et al. | 364/757 |
| 4,214,301 | 7/1980 | Kurihara et al. | 364/150 |
| 4,251,885 | 2/1981 | Dodt et al. | 364/900 |
| 4,253,183 | 2/1981 | Taylor et al. | 364/200 |
| 4,270,181 | 5/1981 | Tanakina et al. | 364/200 |
| 4,315,313 | 2/1982 | Armstrong et al. | 364/200 |
| 4,376,976 | 3/1983 | Lahti et al. | 364/200 |
| 4,392,200 | 7/1983 | Arulpragasam et al. | 364/200 |
| 4,414,669 | 11/1983 | Heckelman et al. | 364/200 |
| 4,435,765 | 3/1984 | Uchida et al. | 364/200 |
| 4,454,578 | 6/1984 | Matsumoto et al. | 364/200 |
| 4,594,655 | 6/1986 | Hao et al. | 364/200 |
| 4,617,625 | 10/1986 | Nagashima et al. | 364/200 |
| 4,621,324 | 11/1986 | Ushiro et al. | 364/200 |

OTHER PUBLICATIONS

Ramcanoorthy and Li, *Pipeline Architecture*, 3/77, pp. 61–102, Computing Surveys, vol. 9, No. 1.
Siewiorek et al., *Computer Structures: Principles and Examples*, 1982, pp. 439–446.

Primary Examiner—Emanuel S. Kemeny
Assistant Examiner—Christopher H. Lynt
Attorney, Agent, or Firm—Townsend and Townsend

[57] ABSTRACT

The various functional units which comprise a central processing unit of a computer are organized so as to enable a main arithmetic logic unit and special function units including an auxilliary arithmetic logic unit to access data registers, literal constants, and data from a memory cache. A general purpose bus closely couples the functional units to the main data paths and allows the CPU sequencer to branch on numerous conditions which may be indicated via test lines. Parity from the functional units is sent to clock cycle later than results in order that the parity path does not affect machine cycle time. The architecture allows unused microcode options to be used to check for correct CPU operation by halting CPU operation on a miscompare of two buses.

15 Claims, 4 Drawing Sheets

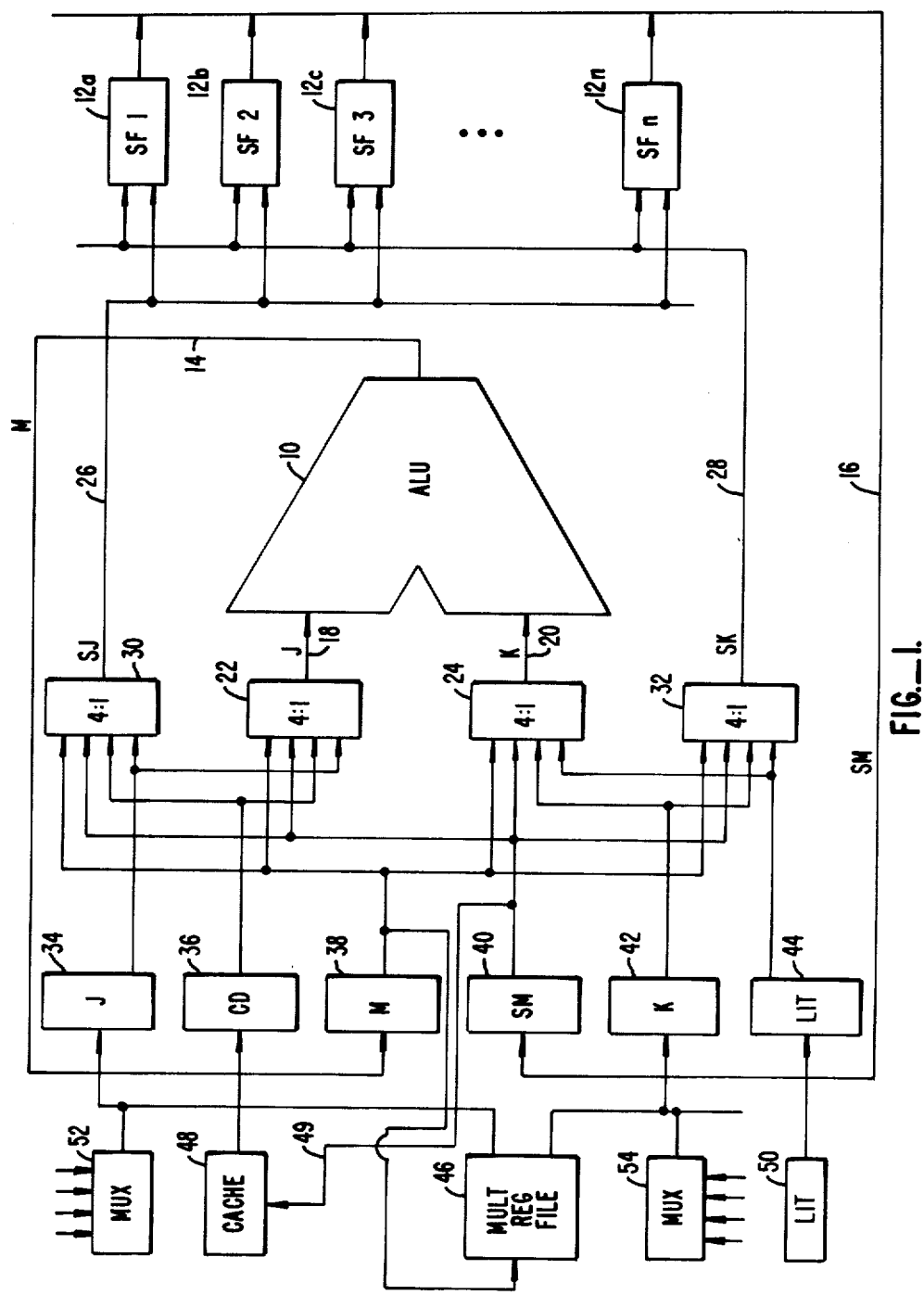
FIG._1.

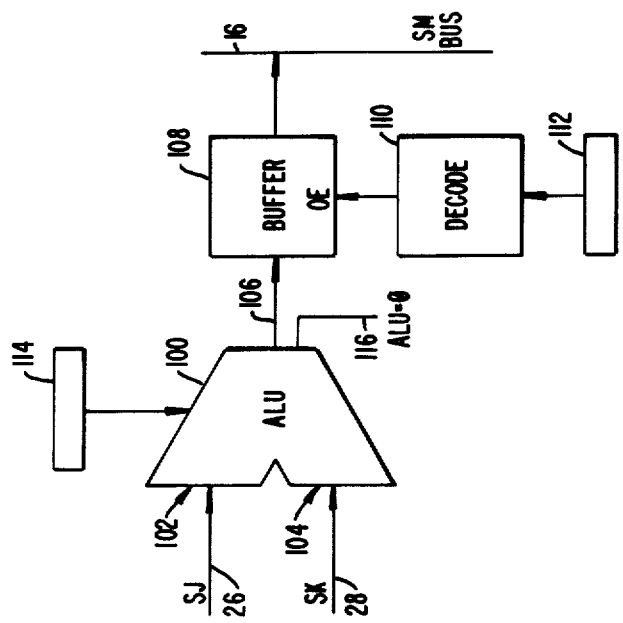
FIG._2.
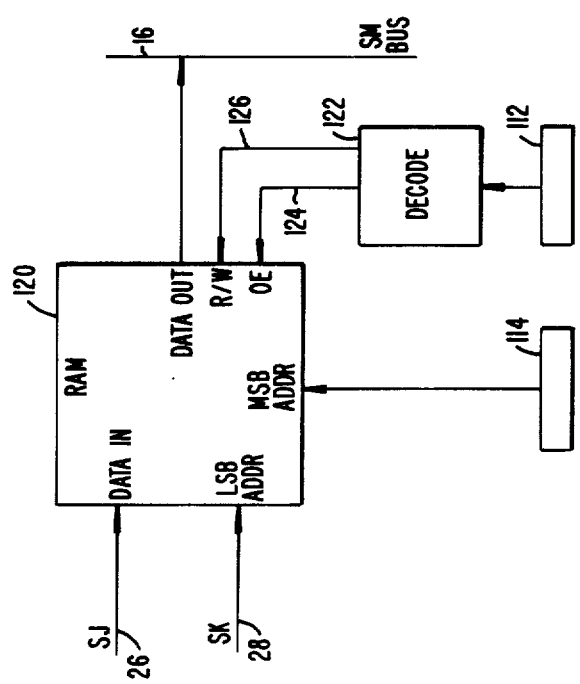
FIG._3.

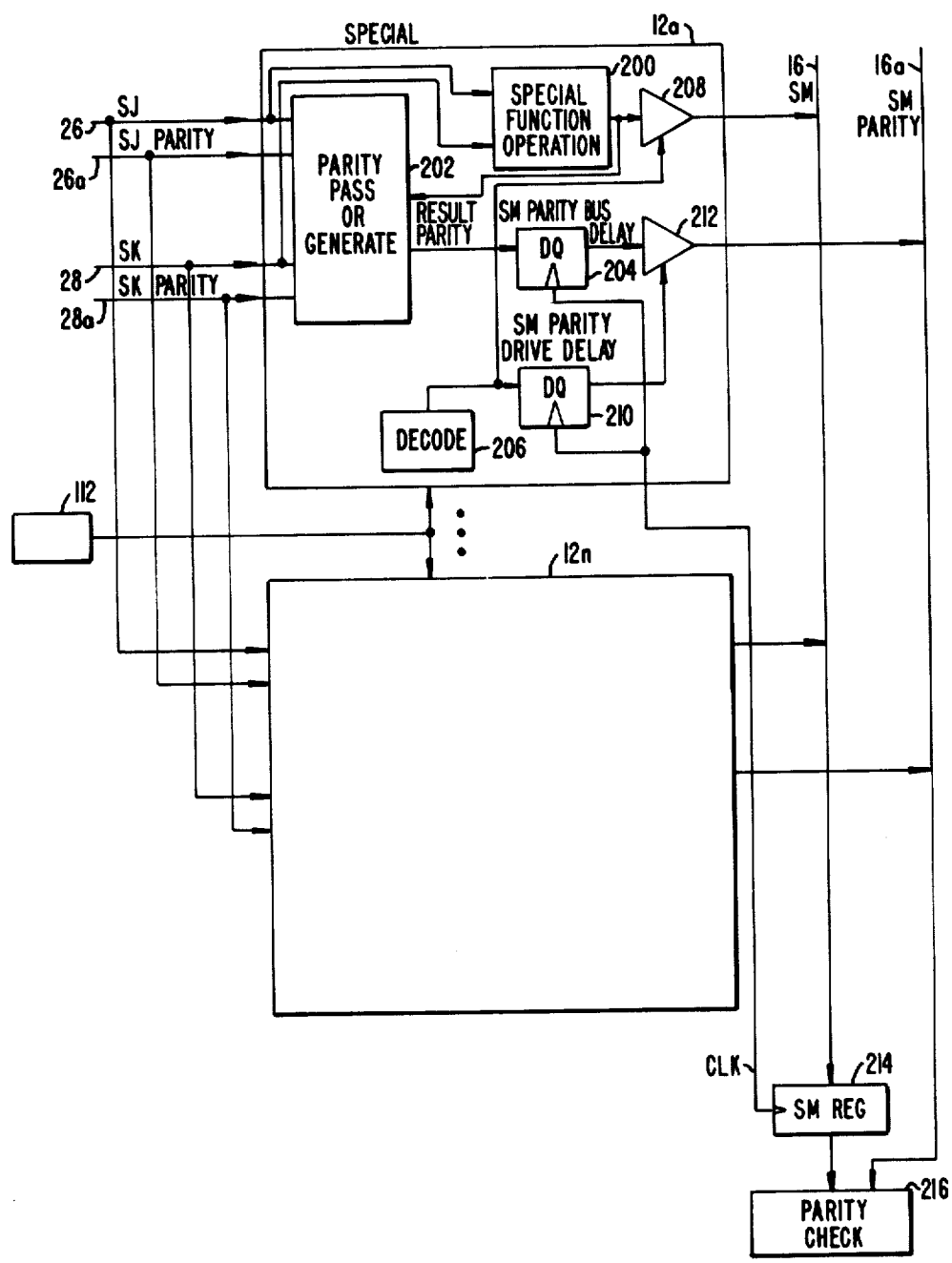
FIG._4.

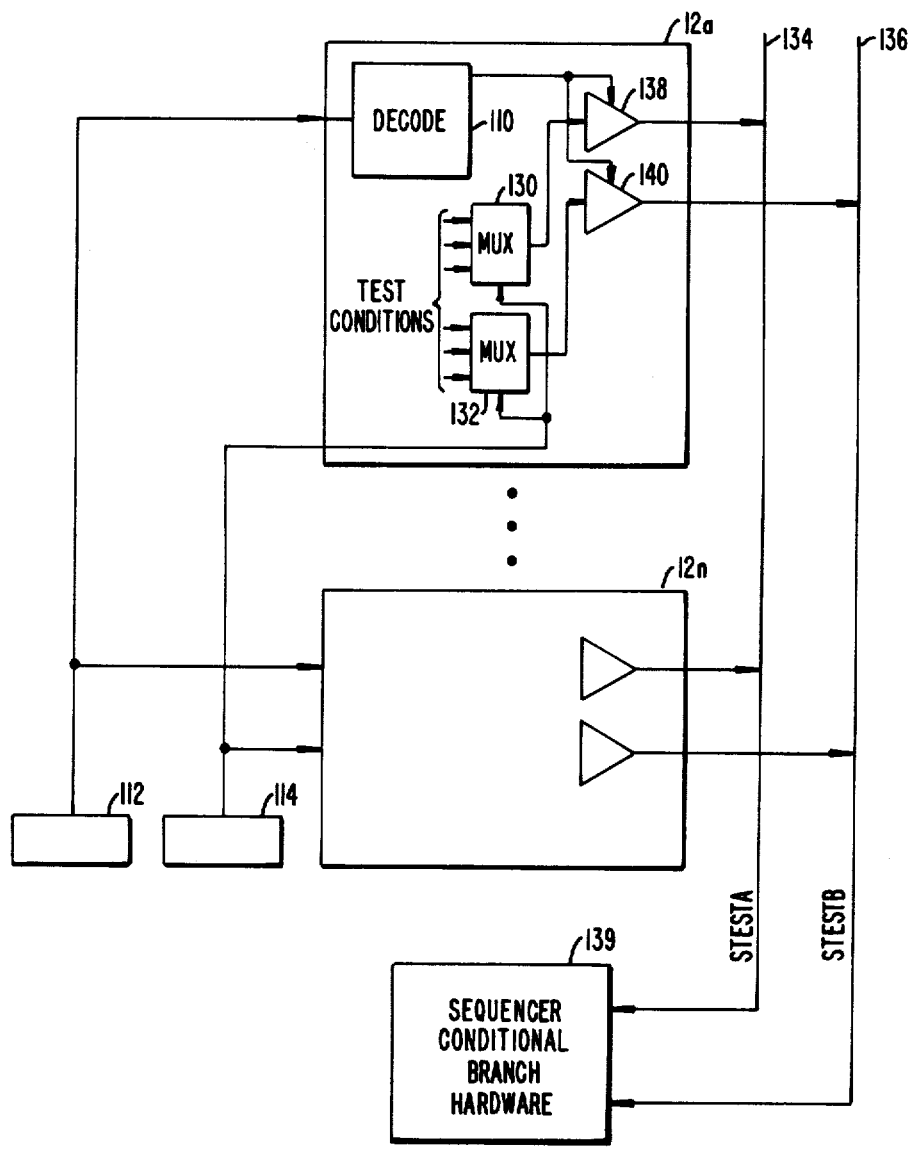
FIG._5.

MULTIPLE DATA PATCH CPU ARCHITECTURE

FIELD OF THE INVENTION

The present invention relates to the central processing unit (CPU) of a data processing system. More particularly, the present invention relates to the organization of the various functional units which comprise a CPU and enables a main arithmetic logic unit (ALU) and various special function units to access data registers, literal constants and data from a memory cache.

BACKGROUND OF THE INVENTION

The central processing unit (CPU) of a data processing system is the portion of the system where data manipulation, logical and arithmetic operations and other data alteration take place. The physical and logical interconnection of the elements of the CPU, the arithmetic logic unit and various registers and multiplexers in a CPU is known as a data path.

Most prior art CPU's have a single data path architecture; that is, they are organized such that the flow of data through the CPU occurs along a single path.

Some prior art CPU's are designed with multiple data paths. These CPU's have used numerous multiported registers in their implementation. However, such arrangements have required the use of large multiplexers. For instance, in a CPU having thirty registers, each multiplexer would be constructed having a thirty-wide input set so as to be capable of servicing all of the registers.

In addition, prior art CPU's may or may not be arranged in a pipelined configuration, i.e., in two or more stages from a timing standpoint such that the execution of a single microinstruction line proceeds in several steps through the data path. Pipelined architecture enables a faster throughput of data through a CPU by allowing portions of different consecutive instructions to be executed simultaneously. For example, while a later phase or rank of a first instruction is being executed, an earlier phase or rank of a second instruction may also be executed.

The data path implementations of the prior art known to the inventors as described above have proved adequate to the task; however, each suffers from one or more of the following drawbacks. Multiple data path CPU's which use multiported registers and multiplexers are usually characterized by a relatively large parts count due to the use of wide multiplexers. In addition, the use of such multiplexers has a limiting effect on the cycle time of the CPU since it is generally true that the wider the multiplexer the longer its associated selection time must be.

Prior art CPU's which are not organized in a pipelined manner are generally not capable of the same instruction throughput rate which pipelined machines are capable.

Another feature of multiple data path prior art CPU's which utilize wide multiplexers is the total flexibility to access the contents of more than two data registers simultaneously. This flexibility, however, may most often prove to provide only an illusory performance advantage since statistically the most used operand is the result from the previous operation.

Therefore, despite the availability of the prior art data path implementation schemes there is still room for improvement from both performance and "performance-versus-cost" standpoints.

In most prior art systems portions of the CPU go unchecked or, alternatively, expensive redundant checking hardware is required. Furthermore, prior art CPU's generally require more interconnections between the test logic and the various functional units to perform microbranching.

Accordingly, it is an object of the present invention to provide a CPU data path architecture which overcomes one or more drawbacks of prior art data path architectures.

Another object of the present invention is to provide a CPU data path architecture having multiple data paths.

A further object of the present invention is to provide a multiple data path CPU architecture which minimizes the multiporting of registers and the use of wide multiplexers.

Another object of the present invention is to provide a multiple data path CPU architecture which allows more than one operation to take place in the CPU per instruction cycle.

These and other objects and advantages of the present invention will become apparent to those of ordinary skill in the art from an examination of the specification, accompanying drawings and appended claims.

BRIEF DESCRIPTION OF THE INVENTION

A multiple data path CPU is disclosed, wherein data sources such as a multiple register file, a memory cache, literal constant register, ALU output and special function output register are organized into at least two sets of operand buses, one set feeding an ALU and one set feeding a set of special function units whose functions are microcode controlled.

Each operand bus is sourced by a multiplexer which draws from a subset of the possible data sources, including holding registers which store the results of the previous operations of the ALU and special function units.

While prior art multiple data path schemes generally multiplex the data sources in a single stage using one or more large multiplexers, the present invention utilizes two stages in a pipelined arrangement where a first rank accomplishes the decoding of the multiple register file and a miscellaneous register multiplexer and a second rank addresses main multiplexers and controls ALU and special function unit functions. Control of special functions includes the selection of one of N special function units and the definition of its function.

The special function arrangement is a closely coupled scheme wherein an auxiliary data path and a set of N special function units, each capable of executing a plurality of functions, interfaces with the main ALU data path. Virtually any special function may be implemented, i.e., an auxiliary ALU; access to a set of scratch-pad registers; barrel shifter; interface to other processors in a multiprocessor system via an interprocessor bus; interface to main memory; interrupt implementation; read and write access to writable control store; interval timer; I/O channel interface.

The fact that there are multiple data paths allows for implementation of checking of the various CPU subsystems in a manner transparent to the system user. During certain operations, unused microcode options may be coded to halt the CPU on a miscompare of two buses.

BRIEF DESCRIPTION OF THE DRAWINGS

FIG. 1 is a block diagram of the CPU of the present invention.

FIG. 2 is a block diagram of an auxiliary ALU implemented as a special function.

FIG. 3 is a block diagram of a scratchpad register array implemented as a special function unit.

FIG. 4 is a block diagram of a special function parity generation hardware.

FIG. 5 is a block diagram of the conditional test hardware capabilities of the special function modules.

DETAILED DESCRIPTION OF THE INVENTION

Referring first to FIG. 1, the overall data path architecture block diagram is depicted. In this preferred embodiment, there are two unit resources being sourced. ALU 10 and special functions units 12a, 12b, 12c ... 12n are serviced by the available data resources. The output of ALU 10 is made available on main bus 14 and the outputs of the special function units 12 share (i.e., only a single one is enabled at a time) special main bus 16.

The source data for these two data resources are delivered on two analogous sets of buses, main buses J and K, 18 and 20 respectively, sourced by 4:1 multiplexers 22 and 24 respectively, and special buses SJ and SK, 26 and 28 respectively, sourced by 4:1 multiplexers 30 and 32 respectively. Multiplexer selection is made via microcode fields as is well understood by those of ordinary skill in the art. While in this preferred embodiment 4:1 multiplexers are used, those skilled in the art will readily observe that a system of richer input interconnection could be supplied, but at the expense of greater hardware complexity with the uncertain benefit of enhanced flexibility.

Not all data resources are available to each multiplexer simultaneously. The 4:1 multiplexers 22 and 30, sourcing the J bus 18 and SJ bus 26, are sourced by several sources; J register 34, CD register 36, M register 38 and SM register 40. The 4:1 multiplexers 24 and 32, sourcing the K bus 20 and SK bus 28, are sourced by M register 38, SM register 40, K register 42 and LIT register 44. Note that the data path is enriched by the commonality of data source registers M 38 and SM 40 to both the M and SM data paths through either side of ALU 10, via J register 34 and K register 42, and thus across J bus 18 and K bus 20, and also through either side of any of the special function modules 12a through 12n, via SJ 4:1 multiplexer 30 and SK 4:1 multiplexer 32, and through SJ bus 26 and SK bus 28.

At this point it will be instructive to point out the functions of the various registers and buses as used in a preferred embodiment of the present invention, although those of ordinary skill in the art will readily observe that these selections are to a degree arbitrary and that other functions or priorities might well be assigned to the various buses and registers and arrangements thereof without departing from the spirit and scope of this disclosure.

The M register 38 holds the results of the previous main ALU result, delivered to its input from the output of ALU 10 via M bus 14. The SM register 40 holds the data result of the previous selected special function from any one of special function modules 12a through 12n.

The J register 34 and the K register 42 each hold the contents of a selected one of a plurality of registers, principally including a selected one of the multiple register file 46. The register file may be loaded from the M register 38. Those skilled in the art will recognize that the J or the K registers may take data from other registers, such as a program counter or memory address registers through other multiplexers as is known.

The CD register 36 holds the output contents of an addressable cache 48 which is loaded from SM register 40 via line 49. The last principal register in this rank of registers is the LIT register 44 which, as its name implies, holds a literal constant supplied by a microcode bit field 50.

The multiple register file 46 is controlled by several microcode fields which specify: the register, if any, to drive to J register 34, and K register 42; the register in the file to be loaded from the M register 38. A pointer register (not shown) acts in conjunction with microcode to select registers to be loaded and read. This register may be loaded from M bus 14 or incremented or decremented by use of microcode fields. All fields used to load these file registers are in rank two, all fields used to read them are in rank one.

As previously mentioned, the operation of the data path in FIG. 1 is preferably accomplished by means of at least a minimal two rank microcode pipeline such as that described in copending applications Ser. No. 537,429, abandoned, filed Sept. 29, 1983, and Ser. No. 537,038, U.S. Pat. No. 457,344, filed Sept. 29, 1983, assigned to the same assignee which are expressly incorporated herein by reference.

In a preferred embodiment of the present invention, the rank one microcode bit field of a given microinstruction decodes the microcode addressing functions for the multiple register file 46, the multiplexer 52 which places the results of one of a number of miscellaneous registers into the input of J register 34, and multiplexer 54 which selects a source for data to the input of the K register 42. Multiplexers 52 and 54 form ports to less frequently accessed registers, such as a program counter, memory address registers, or status registers. Those skilled in the art will recognize that this feature allows access to many registers while leaving the main register paths unencumbered.

The rank two portion microcode bit field of any given microinstruction decodes the 4:1 multiplexers 22, 24, 30 and 32 and controls and defines the operation of ALU 10 and special function units 12a through 12n. With respect to the special function units, a portion of the rank two microcode bit field controls both the selection of one of n special function units 12a through 12n, and also defines its function. Those skilled in the art will recognize that the particular portion of the available microcode field used is unimportant and that any bit positions in the appropriate rank of microcode field may be used. All registers are clocked simultaneously except that CD register 36 is clocked only when microcode specifies a load from the cache. A microcode field provides an inhibit signal (not shown) to CD register 36 to perform this inhibit function. The loading of certain registers (M, SM, CD and multiple register file) may be optionally inhibited during microbranching. See copending application Serial No. 537,886, now U.S. Pat. No. 4,571,673 filed Sept. 29, 1983, assigned to the same assignee as this application.

It will be apparent to those of ordinary skill in the art that the arrangement of the data paths described in the foregoing description of a preferred embodiment of the present invention provides a degree of flexibility from a cost and performance standpoint which affords a successful compromise between hardware complexity and versatility.

Each special function unit 12a through 12n may be dedicated to a related group of tasks. For example, one may be an auxiliary ALU capable of performing logical or arithmetic functions and returning the result to the SM bus.

Referring now to FIG. 2, an embodiment of a special function unit as an ALU is shown. ALU unit 100 has its input 102 connected to SJ bus 26 and input 104 connected to SK bus 28. ALU 100 also has its output 106 connected to buffer 108. Buffer 108 returns the ALU result to the SM bus 16. Since more than one special function unit is attached to the SM bus, buffer 108 has means to prevent bus contention by assuring that this special function unit has control of SM bus 16 only when it is selected. Accordingly, buffer 108 has an OE (output enable) input which is driven by decode unit 110. A microcode field 112 in rank two drives decode unit 110 and drives similar decode units for all special function units attached to SM bus 16. Each decode unit is conditioned to recognize only one of all possible combinations of microcode appearing in microcode field 112. Thus, only one decode unit will enable a buffer to attach a special function unit to the SM 16.

A second microcode field 114 in rank two is shown as an input to ALU unit 100. This microcode field defines the operation to be performed by ALU unit 100 as is known in the art.

In operation, any special unit, such as ALU unit 100, is always attached to the SJ and SK buses, thus always prepared to perform its function. Only one function, however, has control of the SM bus at any one time. This selection is determined by microcode field 112 and decoded by decoder 110 thus enabling buffer 108 to drive the SM bus 16 only when ALU 100 has been selected by a particular bit pattern in microcode field 112.

ALU 100 may have an output ALU=0 (shown at numeral 116) which is useful for performing one of several tests. As previously mentioned, unused microcode options in previous instructions may be used to create operations through the CPU shown generally in FIG. 1 which result in quantities being placed on the SJ and SK buses. If these microcode test routines are designed such that the results appearing simultaneously on the SJ and SK buses are supposed to be equal, output 116 of ALU 100 may be used as the final step in the test to determine whether the hardware tested by the microcode is correctly functioning. Any result other than ALU=0 at this point in the program can be used to halt the processor because of a miscompare on SJ and SK buses 26 and 28, respectively. This hardware provides a method for verifying the correct operation of various parts of the CPU which may not be protected by other means (such as parity) without large amounts of redundant circuitry. The checking proceeds concurrently with normal system operation without impacting performance. For example, the simple ADD macroinstruction does not require the use of the special function modules 12a through 12n and may thus have a test function imbedded in unused lines of its microcode.

The operands to be added are presented to ALU 10 on J bus 18 and K bus 20. In addition, due to the flexibility of the data paths, the same operands may be simultaneously presented to special function ALU 100. The following clock, the results of the main ALU and special ALU are available in M register 38 and SM register 40. These results may then be passed through multiplexers 30 and 32 and presented to inputs 102 and 104 of the special function ALU. The microcode field 114 performs the check function which instructs special ALU 100 to perform a subtract and to halt the CPU if the result is nonzero as indicated by line 116. Thus, the correct operation of both ALU's as well as many of the control paths has been verified.

Another example of a special function unit which may be implemented in the CPU of the present invention is that of a multiple address scratchpad. Scratchpad 120 which may be configured of RAM or other suitable memory or register devices, is shown connected to the SJ, SK and SM buses, 26, 28, and 16, respectively. The SJ bus is used as a data input port for scratchpad 120, the SK bus is used to hold a portion of the address used to access scratchpad 120. Another portion of the address used to address scratchpad 120 is derived from microcode field 114.

As in the ALU example, a decode unit 122 examines microcode field 112 to determine whether a particular bit pattern has selected scratchpad 120 for enabling on to SM bus 16. However, unlike decode unit 110 associated with ALU 100, decode unit 122 has two outputs. One of these outputs, line 124, provides a single bit to the output enable of scratchpad 120. This output enable input is used as is known in the art to disable the output drivers of scratchpad 120 so that it may selectively be connected to SM bus 16. The second output, line 126, is used to drive read/write input of scratchpad 120 and defines whether scratchpad 120 will be performing a read or a write operation.

In a more general sense, it can be seen from the above examples, that microcode field 112 is generally usable to decode the selection of a particular special function unit and place its output on SM bus 16. Microcode field 114 is useful for performing special addressing functions or function definitions for whatever special function unit is embodied.

While parity is normally sent along with the data it serves, the special function units 12a through 12n send parity a clock cycle later. Otherwise, in cases where a special function unit 12a through 12n would generate parity in series with output data from a special function unit, the generation of parity would slow down the cycle time of the machine.

To prevent cycle time slow downs, special function units 12a through 12n send parity information a clock cycle later than data information. The parity generation time therefore does not affect the minimum cycle time of the CPU.

Referring now to FIG. 4, the parity generating mechanism for the special function units is described.

FIG. 4 illustrates special function units 12a through 12n with their inputs connected to SJ bus 26, SK bus 28, and their outputs connected to SM bus 16. In addition to these buses, FIG. 4 illustrates SJ parity bus 26a and SK parity bus 28a driving the inputs of both special function modules as well as SM parity bus 16a being selectively driven by special function units 12a through 12n. Special function unit 12a, as illustrative of all special function units, is seen to contain parity pass or generate unit 202 as well as the special function operation 200, which may be, for instance, ALU 100 of FIG. 2, or scratchpad 120 of FIG. 3. Depending on the nature of the particular special function unit involved, parity for this unit may either be passed through or generated. For instance, if the special function unit is a scratchpad, parity is merely passed along with the data to be stored in the scratchpad. If special function operation 200 is an ALU, parity will be generated from the ALU result.

In other cases, such as where a special function unit involves a counting operation, if the input states and the input parity is known, an algorithm may be used to predict what the parity will be on the function result. As is known in the art, there are many hardware schemes which may be used to predict parity based on the input operands and the operation being performed. Parity pass or generate unit 202 can also employ these forms of parity prediction.

The resulting parity bit generated by parity pass or generate unit 202 is placed in SM parity bus delay register unit 204 on the first effective clock following its generation.

It will be noted that microcode field 112, which, as previously discussed is used to enable a particular special function unit 12a through 12n is shown driving the decode unit 206. Decode unit 206 is similar in function to decode unit 110 and 122 from FIGS. 2 and 3, however it is shown here possessing another function relating to parity. A portion of the output of decode unit 206 is shown performing the SM bus output function via buffer 208 which is shown schematically as one having a disable function as is known in the art. The output of decode unit 206 also supplies the data input to SM parity drive delay register 210. The output of SM parity drive delay register 210 drives the enable/disable line of output buffer 212 which delivers the SM parity bus delay register result to the SM parity bus 16a.

Those skilled in the art will realize that the result of the special function operation shown in box 200 is passed through buffer 208 to SM bus 16 one clock cycle prior to the parity bit being available on SM parity bus 16a because of the clock delay through register 204 and 210. However, to compensate for this, parity bus 16a drives parity check 216. The output of SM register 214 is delivered to parity checker 216 as is the unregistered parity bit from SM parity bus 16a. Since the parity bit on SM bus parity bus 16a has been delayed by one clock cycle, the addition of SM register 214 to the parity data bus delays the data output on the SM bus 16 by that one clock cycle so that parity checking unit 216 receives both data and the parity bit at the same time.

While this disclosure has generally illustrated the concept of parity as a single bit per word, those skilled in the art will understand that other schemes may also be used. For instance, a number of parity bits may be used to cover various subfields of the entire word. Two parity bits, each covering one half (lower or upper) of a word might be used.

Referring now to FIG. 5, a block diagram of the conditional test hardware capabilities of the special function modules, the hardware architecture allowing the CPU sequencer to branch on numerous test conditions will be disclosed.

Located within each of special function module units 12a through 12n, as previously described, are various special function units which are capable of performing various tests on the parameters with which they operate. For instance, if the special function unit is an ALU, the various tests which can be performed may include the setting of a carry bit, ALU=0, positive or negative ALU results.

Each special function unit 12 is equipped with two multiplexers 130 and 132, respectively which select from among the numerous test conditions available for that module via a portion of microcode field 114, discussed previously with respect to FIGS. 2, 3 and 4. Those skilled in the art will realize that the selection of two specific tests is somewhat arbitrary and that a greater or smaller number of tests could be selected from, thus altering the number of multiplexers like multiplexers 130 and 132. The outputs of multiplexers 130 and 132 are driven on two buses, STESTA bus 134 and STESTB bus 136, respectively, via buffers 138 and 140, respectively. In a manner similar to that depicted in FIGS. 2 through 4, buffers 138 and 140 may have their outputs disabled when special unit function 12 with which they are associated is not driving either the SM bus or STESTA line 134 or STESTB line 136. The disabling inputs of buffers 138 and 140 are driven by decode circuit 110 which decodes a microcode bit field 112 as previously discussed with respect to these special function units.

Thus, when a special function unit has been selected, and a test or set of tests defined by a portion of the microcode field 114, the results of these tests through multiplexers 130 and 132 and buffers 138 and 140 are placed on STESTA line 134 and STESTB line 136.

STESTA line 134 and STESTB line 136 terminate in sequencer conditional branch hardware unit 139. The function of sequencer branch hardware unit 139 is to use the tests results supplied to it by the STESTA and STESTB buses to perform microbranching and to selectively inhibit lines of microcode when certain microbranches have been taken. The architecture and functioning of sequencer conditional branch hardware unit 139 is completely disclosed in copending applications Ser. No. 537,886, filed Sept. 29, 1983 now U.S. Pat. No. 4,571,673, assigned to the same assignee as the present invention, which is expressly incorporated herein by reference.

The widths of the particular buses shown herein may be determined with reference to a particular application. While the inventors have employed a width of 16 bits plus two parity bits, the actual bus widths which may be used with the current invention are simply a matter of design choice.

The number and uses of the various registers is exemplary only and is not meant to indicate a limitation. Those skilled in the art will understand the invention could function with use of TTL, ECL, CMOS, MOS, NMOS or other technologies if the inherent technology dependent design rules are observed.

The registers, multiplexers, ALU's and special function logic may be implemented as discrete logic elements or as part of gate arrays or custom LSI.

We claim:

1. A CPU architecture for use in data processing systems wherein an instruction causes operands to be processed during execution of a microcode word, including:

arithmetic logic means in a first data path for performing arithmetic logic operations on operands as specified by a first microcode filed of the microcode word, at least one selectable function means in a second data path for performing operations on operands simultaneously with the arithmetic logic operations as specified by a second microcode filed of the microcode word, a plurality of first register means for holding operands for processing by said arithmetic logic means and said function means, a plurality of first select logic means, responsive to a third microcode field of the microcode word, for selectively connecting one of said first register means to said arithmetic logic means and one of said first register means to said function means, first return bus means for returning results from an operation of said arithmetic logic means to at least one of said first register means, and second return bus means for returning results from an operations of said function means to at least one of said first register means, 2. A CPU architecture for use in data processing systems wherein an instruction causes operands to be processed during execution of a microcode word, including:

arithmetic logic operations on operands as specified by a first microcode field of the microcode word, at least one selectable function means in a second data path for performing operations on operands simultaneously with the arithmetic logic operations as specified by a second microcoded field of the microcode word, a plurality of first register means for holding operands for processing by said arithmetic logic means and said function means, a plurality of first select logic means, responsive to a third microcode field of the microcode word, for selectively connecting one of said first register means to said arithmetic logic means and one of said first register means to said function means, first return bus means for returning results from an operation of said arithmetic logic means to at least one of said first register means, second return bus means for returning results from an operations of said function means to at least one of said first register means, and at least one second register means connected to at least one of said first register means for holding operands for processing by said arithmetic logic means and said function means and selectively supplying said operands to said first register means in response to a fourth microcode field of the microcode word.

3. The CPU architecture of claim 2 further including:

bus means, connected between said first and second register means, for communicating operands form at least one of said first register means to said at least one of second register means.

4. A CPU architecture for use in a data processing system wherein an instruction causes operands to be processed during execution of a microcode word having at least first, second, third, fourth, and fifth microcode fields, including:

arithmetic logic means in a first data path for performing arithmetic logic operations on operands as specified by the first microcode field, at least one selectable function means in a second data path for performing operations on operands simultaneously with the arithmetic logic operations as specified by the second microcode field, a plurality of first register means for holding operands for processing by said arithmetic logic means and said function means, a plurality of first select logic means, responsive to the third microcode field, for selectively connecting one of said first register means to said arithmetic logic means and one of said first register means to said function means, first return bus means for returning results from an operation of said arithmetic logic means to at least one of said first register means, second return bus means for returning results from an operation of said arithmetic logic means to at least one of said first register means, second return bus means for returning results from an operation of said function means to at least one of said first register means, at least one second register means connected to at least one of said first register means for holding operands for processing by said arithmetic logic means and said function means and selectively supplying said operands to said first register means in response to the fourth microcode field, and at least one second select logic means connected to at least one of said first register means for selectively connecting one of a plurality of data sources to said first register means in response to the fifth microcode field.

5. A pipelined CPU architecture for use in data processing systems including:

arithmetic logic means in a first data path for performing arithmetic logic processes on operands, a plurality of selectable function means in a second data path for processing operands simultaneously with the arithmetic logic means, said function means selected in response to a first microcode field in a microinstruction, the function means including sense means for indicating whether one of a plurality of test conditions selected by a test selection microcode field of the microcode word has been met, a plurality of first register means for storing operands for processing, a plurality of first multiplexer means, connected to the first register means and the data paths and responsive to a second microcode field in the microinstruction, for simultaneously placing selected ones of the operands on the first and second data paths, first return bus means for returning results from the arithmetic logic means to at least one of the first register means, second return bus means for returning results from an operation of the function means to at least one of the first register means, and microbranching means, connected to a microsequencer in said CPU, and responsive to the sense means, for performing microbranching when the sense means indicates the selected test condition has been met.

6. The CPU architecture of claim 5, wherein said plurality of function means includes an arithmetic logic unit.

7. The CPU architecture of claim 5, wherein said plurality of function means includes a multiple address scratchpad.

8. The CPU architecture of claim 5, wherein said plurality of first register means includes a literal constant register.

9. The CPU architecture of claim 5, further including:

parity generating means, including parity bus means, in said plurality of function means for generating parity data for operands processed by said plurality of function means, the parity generating means also including delay means for placing said parity data on said parity bus means on a clock cycle occurring later than a clock cycle in which said results from an operation of said function means are placed on said second return bus means.

10. The CPU architecture of claims 2, 4, or 3, wherein said plurality of second register means includes a memory cache.

11. The CPU architecture of claims 5, 1, 2, 4, 3, 6, 7 or 8, further including:
parity checking means for checking parity accompanying said operands, including means for synchronizing said operands and accompanying parity causing said operands and accompanying parity to arrive at said parity checking means during a signal clock period.

12. The CPU architecture of claim 1, 2, 4, or 3, including:
sense means in said at least one selectable function means for indicating whether one of a plurality of test conditions selected by a test selection microcode field of the microcode word has been met, and
microbranching means, connected to a microsequencer in said CPU, and responsive to said sense means, for performing microbranching when said sense means indicates said selected test condition has been met.

13. A central processing unit of a data processing system having an arithmetic logic unit in a data path, wherein an instruction causes operands to be processed during an instruction cycle, including:
a plurality of selectable function means, in a data path separate from that of said arithmetic logic unit, for performing operations on operands during said instruction cycle in accordance with said instruction, said instruction causing the selection of one of said function means and defining its function and its operands;
sense means in said function means for indicating that a test condition has been met; and
microbranching means, connected to a microsequencer in said CPU, responsive to said sense means, for performing microbranching when aids sense means indicates said test condition has been met.

14. The central processing unit as in claim 13, further including parity generating means, including parity bus means, in each of said plurality of selectable function means for generating parity data for results of operands processed by said plurality of selectable function means and delay means for placing said parity data on said parity bus means on a clock cycle occurring later than a clock cycle in which said results from an operation of said function means are placed at the output of said function means.

15. The central processing limit of claim 14, further including parity checking means for checking parity, including delay means for synchronizing said results and said parity data so that they arrive at said parity checking means during a single clock period.

* * * * *